United States Patent
Shetty et al.

[11] Patent Number: 5,870,714
[45] Date of Patent: Feb. 9, 1999

[54] EPL SCHEDULED PRICE VERIFICATION SYSTEM AND METHOD

[75] Inventors: Dinesh K. Shetty, Bangalore, India; Terry L. Zimmerman, Lawrenceville, Ga.; Christopher L. Haynes, Doraville, Ga.

[73] Assignee: NCR Corporation, Dayton, Ohio

[21] Appl. No.: 850,352

[22] Filed: May 2, 1997

[51] Int. Cl.⁶ .............................. G06F 17/60; G08B 5/22
[52] U.S. Cl. .................................. 705/20; 705/5; 705/16; 705/26; 705/20; 705/23; 340/825.49
[58] Field of Search .............................. 705/2, 23, 5, 16, 705/26; 340/825.49

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,924,363 | 5/1990 | Kornelson | 362/125 |
| 5,072,381 | 12/1991 | Richardson et al. | 364/410 |
| 5,172,314 | 12/1992 | Poland et al. | 364/401 |
| 5,198,644 | 3/1993 | Pfeiffer et al. | 235/383 |
| 5,241,467 | 8/1993 | Falling et al. | 364/401 |
| 5,260,936 | 11/1993 | Bardet et al. | 370/61 |
| 5,448,226 | 9/1995 | Failing, Jr. et al. | 340/825.35 |
| 5,461,561 | 10/1995 | Ackerman et al. | 364/401 |
| 5,493,107 | 2/1996 | Gupta et al. | 235/383 |
| 5,526,267 | 6/1996 | Sogawa | 364/431.11 |
| 5,537,126 | 7/1996 | Kayser et al. | 345/1 |
| 5,539,393 | 7/1996 | Barfod | 340/825.52 |
| 5,553,412 | 9/1996 | Briehle et al. | 40/642 |
| 5,572,653 | 11/1996 | DeTemple et al. | 395/501 |
| 5,619,416 | 4/1997 | Kosarew | 354/478.13 |
| 5,663,963 | 9/1997 | Goodwin, III | 371/5.1 |
| 5,694,418 | 12/1997 | Goodwin, III | 375/219 |
| 5,704,215 | 8/1998 | Goodwin, III | 705/26 |
| 5,729,696 | 5/1998 | Goodwin, III et al. | 395/222 |
| 5,753,900 | 5/1998 | Goodwin, III et al. | 234/383 |
| 5,754,106 | 5/1998 | Goodwin, III | 340/540 |
| 5,758,064 | 5/1998 | Zimmermann et al. | 395/183.19 |
| 5,771,005 | 6/1998 | Goodwin, III | 340/825.35 |
| 5,794,211 | 8/1998 | Goodwin, III et al. | 705/23 |
| 5,797,131 | 8/1998 | Goodwin, III et al. | 705/16 |
| 5,818,346 | 10/1998 | Goodwin, III et al. | 340/825.49 |

*Primary Examiner*—Allen R. MacDonald
*Assistant Examiner*—Pedro R. Kanof
*Attorney, Agent, or Firm*—Paul W. Martin

[57] ABSTRACT

A scheduled price verification system and method which ensure that a scheduled price change has been scheduled for an electronic price label (EPL) associated with an item. The system includes a storage medium for storing an EPL data file and a spool file, and a computer. The computer executes a scheduled price verifier program which reads the EPL data file to obtain identification information for the item associated with the EPL, reads a price file to obtain a new price and a time that the new price is to be effective, reads the spool file after the time to determine whether it contains a record of the one price change to the new price for the EPL, and schedules a price change message containing the new price if the spool file does not contain the record of the one price change to the new price for the EPL.

6 Claims, 3 Drawing Sheets

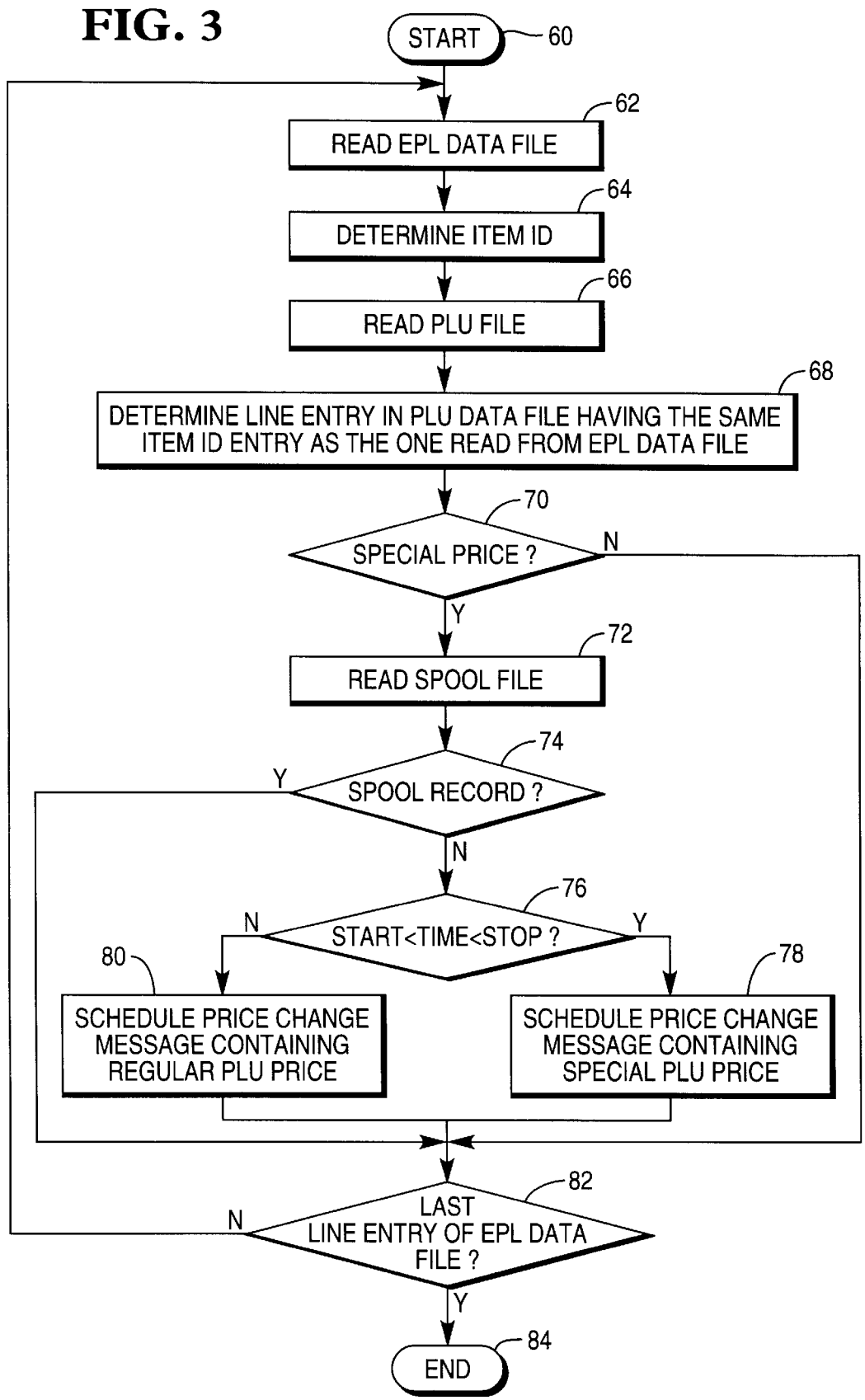

EPL SCHEDULED PRICE VERIFICATION SYSTEM AND METHOD

CROSS-REFERENCE TO RELATED APPLICATIONS

The present application is related to co-pending application Ser. No. 08/490,041, entitled "EPL PRICE VERIFICATION SYSTEM AND METHOD", having as inventors, John Goodwin et al.

BACKGROUND OF THE INVENTION

The present invention relates to electronic price label (EPL) systems, and more specifically to an electronic price label (EPL) scheduled price verification system and method.

In a traditional retail store, bar code scanners rely on price information maintained within a price-lookup (PLU) file. The PLU data file is typically stored in a single location at host server.

EPL systems typically include a plurality of EPLs for each merchandise item in a store. EPLs display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. The EPL data file contains EPL identification information and EPL merchandise item information.

A server, either within a store or outside the store, sends price changes to EPLs. This server is typically a price look-up (PLU) file server. Scheduling and transmission of price change messages must occur without error in order to ensure that correct prices are displayed by EPLs associated with scheduled items. This is especially true during special promotions or "sales". A PLU file typically includes a start time, end time, and special price for each specially promoted item.

Therefore, it would be desirable to provide an EPL scheduled price verification system and method that can verify that a scheduled price change message for a specially promoted item has been transmitted to an EPL. It would also be desirable to provide an EPL scheduled price verification system and method that can verify that a new price for an item has been scheduled and transmitted to an EPL when the new price is known in advance.

SUMMARY OF THE INVENTION

In accordance with the teachings of the present invention, an electronic price label (EPL) scheduled price verification system and method are provided.

The system includes a storage medium for storing an EPL data file, which contains EPL identification information, and spool file, which contains records of scheduled price changes including the one price change. The system further includes a computer. The computer executes a scheduled price verifier program.

The scheduled price verifier program reads the EPL data file to obtain identification information for the item associated with the EPL, reads a price file to obtain a new price and a time that the new price is to be effective, reads the spool file after the time to determine whether it contains a record of the one price change to the new price for the EPL, and schedules a price change message containing the new price if the spool file does not contain the record of the one price change to the new price for the EPL.

The system and method of the present invention are particularly suited for verifying that special prices associated with "sales" events are scheduled. If a price change record for the EPL is not in the spool file, the scheduled price verifier program reads the price file to obtain a start time and a stop time associated with the special price for the item, determines a current time, and schedules another price change. The other price change contains the special price if the current time is between the start and stop times and contains a regular price for the item obtained from the price file if the current time is not between the start and stop times.

It is accordingly an object of the present invention to provide an electronic price label (EPL) scheduled price verification system and method.

It is another object of the present invention to provide a system and method which ensures that a price change message has been scheduled for transmission to an EPL associated with a specially promoted item.

It is another object of the present invention to provide a system and method which verify that a new price for an item has been scheduled for transmission to an EPL when the new price is known in advance, such as by an entry in a price look-up (PLU) file.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 is a flow diagram illustrating the method of the present invention.

DETAILED DESCRIPTION OF THE PREFERRED EMBODIMENT

Figure 1:
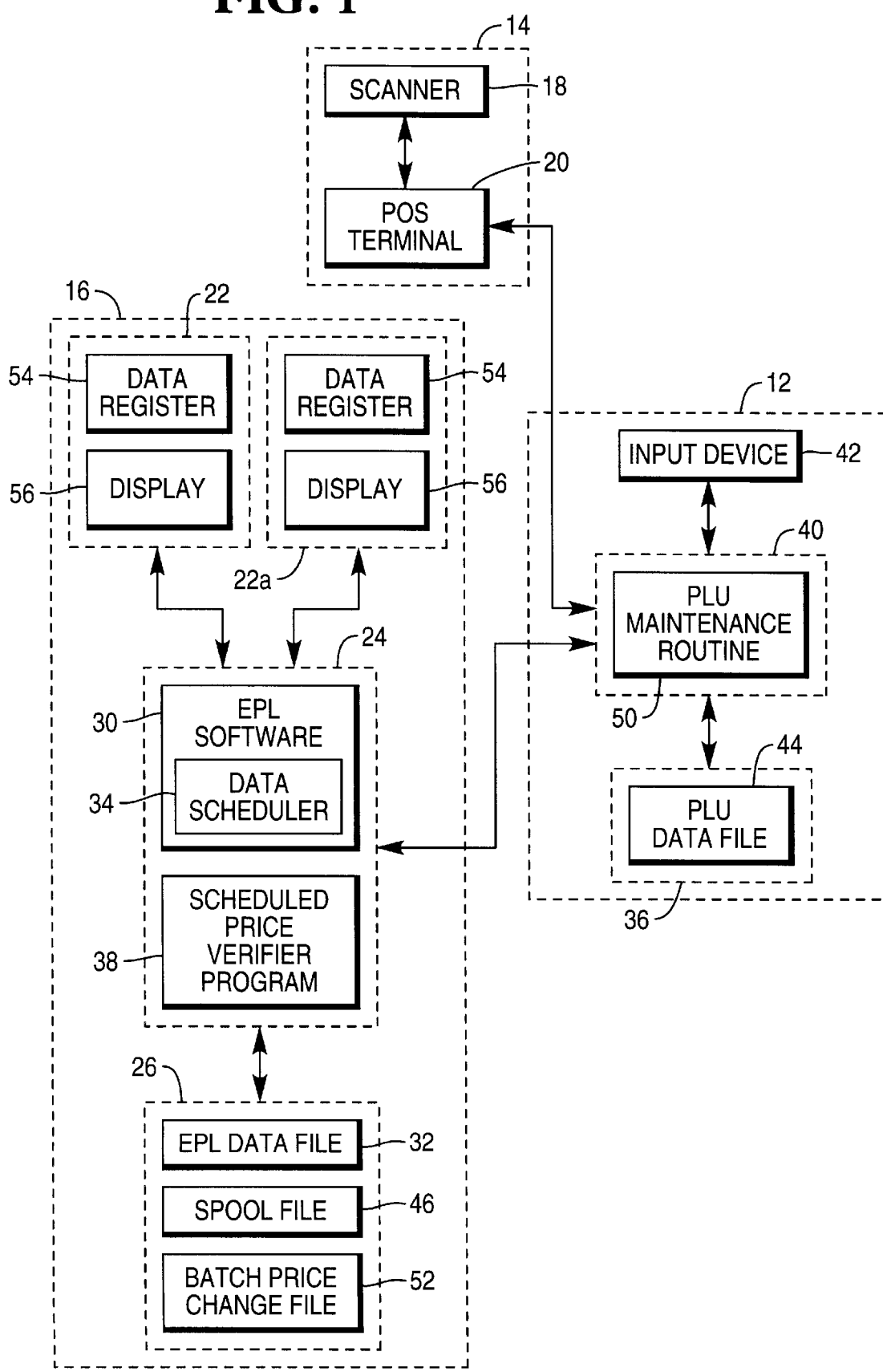
FIG. 1 is a block diagram of a transaction management system.

Referring now to FIG. 1, store system 10 primarily includes host computer system 12, point-of-service (POS) system 14, and EPL system 16.

POS system 14 includes bar code scanner 18 and terminal 20.

EPL system 16 primarily includes EPLs 22, host EPL terminal 24, and EPL storage medium 26.

EPLs 22 are typically attached to shelves within a store and include a data register 54 and a display 56. Data registers 54 contain data, usually the price of an item associated with an EPL on the shelves. The data is typically displayed by display 56. Special EPLs 22a display special prices, sometimes called "sale" prices. Special prices are temporary in nature and are associated by stores with special promotions of products. Special prices are typically identified within price look-up (PLU) data file 44.

Host EPL terminal 24 executes EPL software 30, which maintains the contents of EPL data file 32. Host EPL terminal 24 also executes scheduled price verifier software 38, which is responsible for verifying that price change messages have been scheduled by data scheduler 34 and that correct prices are displayed by EPLs 22.

Host EPL terminal 24 includes a real time clock and BIOS firmware which reports the current time to application programs that request it. Scheduled price verifier software 38 uses time reported by the BIOS firmware to determine whether a price change message containing a regular or special price should be sent to an EPL when scheduled price verifier software 38 fails to detect a price change in spool file 46.

EPL software 30 records, schedules, and transmits all messages to EPLs 22. EPL software 30 also maintains and uses EPL data file 32, which contains item information and EPL identification information for each of EPLs 22.

EPL software 20 includes data scheduler 34 which schedules EPL price change messages to EPLs 22. Data scheduler 34 produces spool file 46 which contains records of price changes scheduled by data scheduler 34.

EPL storage medium 26 stores EPL data file 32 and spool file 46 and is preferably a fixed disk drive.

Host computer system 12 includes PLU storage medium 36, host PLU terminal 40, and input device 42.

PLU storage medium 36 stores PLU data file 44. PLU data file 44 is preferably the sole location for storing item prices and is available for distribution to POS terminal 20 by host PLU terminal 40. Alternatively, provision may be made for bar code scanner 18 to directly access primary PLU data file 44 from host PLU terminal 40.

Here, terminals 20, 24, and 40 are shown as separate components that are networked together, but they may also be combined in different ways. For example, EPL terminal 24 and host PLU terminal 40 may be combined to form a single host computer. POS terminal 20 and host PLU terminal 40 may be combined to form a POS terminal which doubles as a host computer for a network of other POS terminals. Host computer system 12 may also be a remote computer system at a location where many stores are managed. In such a case, host computer system 12 maintains prices in PLU data file 44 and sends prices to EPL computer 24.

Host PLU terminal 40 executes PLU maintenance routine 50. PLU maintenance routine 50 updates PLU data file 44.

Input device 42 is preferably a keyboard.

PLU maintenance routine 50 may send changes in price in PLU data file 44 directly to EPL terminal 24 and POS terminal 20 as they are entered in input device 42 (immediate processing) or store price changes within a batch file 52 in EPL storage medium 26 for later batch updating (batch processing).

Figure 2:
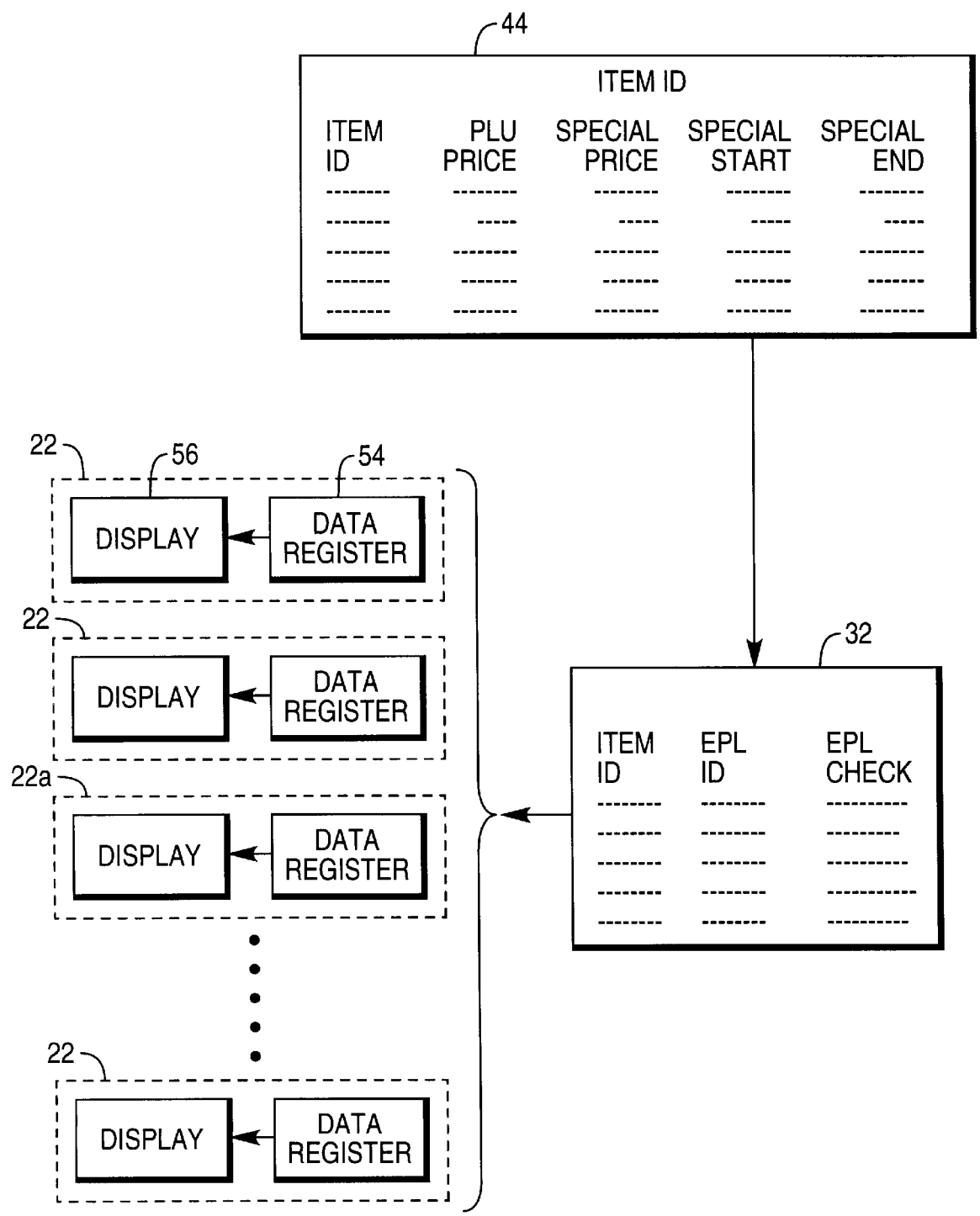
FIG. 2 is a diagram of the information within the PLU data file and the EPL data file.

Turning now to FIG. 2, EPL data file 32 and PLU data file 44 are shown in more detail. EPL data file 32 includes a line entry for each EPL 22 in EPL system 16. Each line entry has an item identification entry (ITEM ID), and an EPL identification entry (EPL ID). Entry ITEM ID identifies a store item. Entry EPL ID identifies which EPL is assigned to the item.

PLU data file 44 includes a line entry for each item sold in the store. Each line entry has an item identification entry (ITEM ID) identifying a store item, and a regular PLU price entry (PLU PRICE) identifying the price read by POS system 14 to determine the price of each item during scanning by bar code scanner 18. The line entries optionally include a special price entry (SPECIAL PRICE) and effective start and stop dates and times (SPECIAL START, SPECIAL END) for specially-priced items.

During normal operation, EPL software 30 obtains price information for an item from PLU data file 44. EPL software 30 creates a checksum of the price information and compares the checksum to entry EPL CHECK for the EPL associated with the item. If the checksums are different, EPL software 30 creates a price change message to change the price displayed by the EPL. Data scheduler 34 schedules the price change message for transmission and writes an entry in spool file 46. EPL software 30 also controls transmission of price change messages to the EPL. The EPL stores the price data in register 54. Finally, display 56 displays the price in data register 54.

Scheduled price verifier software 38 reads spool file 46 to determine whether a price change message for a particular item was scheduled by data scheduler 34.

If a price change message was scheduled, EPL software 30 may additionally verifier that the price displayed by the EPL is the correct price by calculating a checksum from the correct price in PLU data file 44 and comparing the checksum to the checksum entry EPL CHECK. If the checksums are not equal, then the EPL is not displaying the correct price because a price change message containing the correct price was not scheduled, transmitted, or received. EPL software 30 normally verifiers prices for all EPLs, including EPL associated with special items.

Turning now to FIG. 3, the operation of scheduled price verifier program 38 is shown in more detail beginning with START 60.

In step 62, scheduled price verifier software 38 reads EPL data file 32.

In step 64, scheduled price verifier software 38 examines entry ITEM ID in EPL data file 32.

In step 66, scheduled price verifier software 38 reads PLU data file 44.

In step 68, scheduled price verifier software 38 reads the line entry in PLU data file 44 having the same ITEM ID entry as the one read from EPL data file 32.

In step 70, scheduled price verifier software 38 examines entry SPECIAL PRICE in the line entry from PLU data file 44 to determine whether a special price has been assigned to the item. If not, then operation proceeds to step 82 to examine another EPL. Otherwise, operation proceeds to step 72.

In step 72, scheduled price verifier software 38 reads spool file 46.

In step 74, scheduled price verifier software 38 determines whether a spool record for the EPL exists in spool file 46. If so, then operation proceeds to step 82 to examine another EPL. Otherwise, a price change message has not been sent to the EPL and operation proceeds to step 76.

In step 76, scheduled price verifier software 38 determines whether the current time is between the start and stop times for the special promotion. If so, scheduled price verifier software 38 schedules a price change message containing the special price in step 78 and operation proceeds to step 82. If not, scheduled price verifier software 38 schedules a price change message containing the regular price in step 80 and operation proceeds to step 82.

In step 82, scheduled price verifier software 38 determines whether the last record of EPL data file 32 has been checked. If not, then operation returns to step 62 to read the next record. If so, operation ends at step 84. Alternatively, operation may also return to step 62 to start over.

Although the present invention has been described with particular reference to certain preferred embodiments thereof, variations and modifications of the present invention can be effected within the spirit and scope of the following claims.

What is claimed is:

1. A method of verifying that a price change has been scheduled for an electronic price label (EPL) associated with an item, comprising the steps of:

(a) providing a spool file for storing records of scheduled price changes including the one price change;

(b) reading an EPL data file to obtain identification information for the item associated with the EPL;

(c) reading a price file to obtain a special price for the item; and (d) reading the spool file to determine whether it contains a record of the one price change for the EPL.

2. The method as recited in claim 1, further comprising the steps of:

(e) reading the price file to obtain a start time and a stop time associated with the special price for the item;

(f) determining a current time; and (g) scheduling another price change, wherein the other price change contains the special price if the current time is between the start and stop times and contains a regular price for the item obtained from the price file if the current time is not between the start and stop times.

3. A method of verifying that a price change has been scheduled for an electronic price label (EPL) associated with an item, comprising the steps of:

(a) providing a spool file for storing records of scheduled price changes including the one price change;

(b) reading an EPL data file to obtain identification information for the item associated with the EPL;

(c) reading a price file to obtain a new price and a time that the new price is to be effective;

(d) reading the spool file after the time to determine whether it contains a record of the one price change to the new price for the EPL; and (e) scheduling a price change message containing the new price if the spool file does not contain the record of the one price change to the new price for the EPL.

4. A system for verifying that a price change has been scheduled for an electronic price label (EPL) associated with an item, comprising:

a computer system coupled to the EPL, including a terminal and a storage medium coupled to the terminal;

wherein the storage medium contains an EPL data file, which contains EPL identification information, and spool file, which contains records of scheduled price changes including the one price change; and wherein the computer terminal executes a scheduled price verifier program which reads the EPL data file to obtain identification information for the item associated with the EPL, reads a price file to obtain a special price for the item, and reads the spool file to determine whether it contains a record of the one price change for the EPL.

5. The system as recited in claim 4, wherein the computer terminal also reads the price file to obtain a start time and a stop time associated with the special price for the item, determines a current time, and schedules another price change, wherein the other price change contains the special price if the current time is between the start and stop times and contains a regular price for the item obtained from the price file if the current time is not between the start and stop times.

6. A system for verifying that a price change has been scheduled for an electronic price label (EPL) associated with an item, comprising:

a computer system coupled to the EPL, including a terminal and a storage medium coupled to the terminal;

wherein the storage medium contains an EPL data file, which contains EPL identification information, and spool file, which contains records of scheduled price changes including the one price change; and wherein the computer terminal executes a scheduled price verifier program which reads the EPL data file to obtain identification information for the item associated with the EPL, reads a price file to obtain a new price and a time that the new price is to be effective, reads the spool file after the time to determine whether it contains a record of the one price change to the new price for the EPL, and schedules a price change message containing the new price if the spool file does not contain the record of the one price change to the new price for the EPL.

* * * * *